May 3, 1966     W. M. HEFLIN, JR     3,249,685
ELECTRICALLY CONDUCTIVE PIPE JOINT
Filed Oct. 15, 1963

Witness:
R. Faust

INVENTOR.
William M. Heflin, Jr.
BY Walter F. Schlegel, Jr.
Atty.

United States Patent Office 3,249,685
Patented May 3, 1966

3,249,685
ELECTRICALLY CONDUCTIVE PIPE JOINT
William M. Heflin, Jr., Elmhurst, Ill., assignor to Amsted Industries Incorporated, Chicago, Ill., a corporation of New Jersey
Filed Oct. 15, 1963, Ser. No. 316,349
1 Claim. (Cl. 174—84)

This invention relates to pipe joints and more particularly to gaskets for effecting a gas and liquid tight seal between joints of tandemly connected lengths of pipe.

In the construction of a pipe line, the usual method involves the necessity of connecting together a great many individual, relatively short lengths of pipe. The number of lengths connected in any given distance depends generally upon the nominal size of pipe being connected. That is, the larger the diameter of the pipe, the shorter the legth of pipe that may be used. This is due, of course, to the difficulty of handling large sections of pipe. Consequently, in a pipe line of any magnitude it can be easily seen that many connections or pipe joints will have to be made.

It has been customary in the water works industry for manufacturers of pipe to fabricate each pipe length with one end flared in the shape of a bell and the other end straight like a spigot. Thus, each connection in a pipe line requires that a spigot end of a pipe be placed within a bell end of a succeeding pipe and a seal of some type placed therein to effectuate a joint impervious to the fluid being transmitted through the pipe line.

Therefore, it is apparent that if proper connections could be made between spigot type ends of pipe sections the cost of fabricating bell ends on pipe could be eliminated.

Accordingly, it is a primary object of this invention to provide a gasket that eliminates the need for bell and spigot ends to effectuate connections between pipe sections.

Another object of this invention is to provide a gasket that will seal tandemly connected spigot ends of pipe sections.

A further object of this invention is to provide a gasket that will adjust mechanically to seal the ends of longitudinally adjoining pipe sections.

Other objects and advantages of this invention will become apparent when reference is made to the following written description considered in conjunction with the accompanying drawings wherein.

Figure 1:
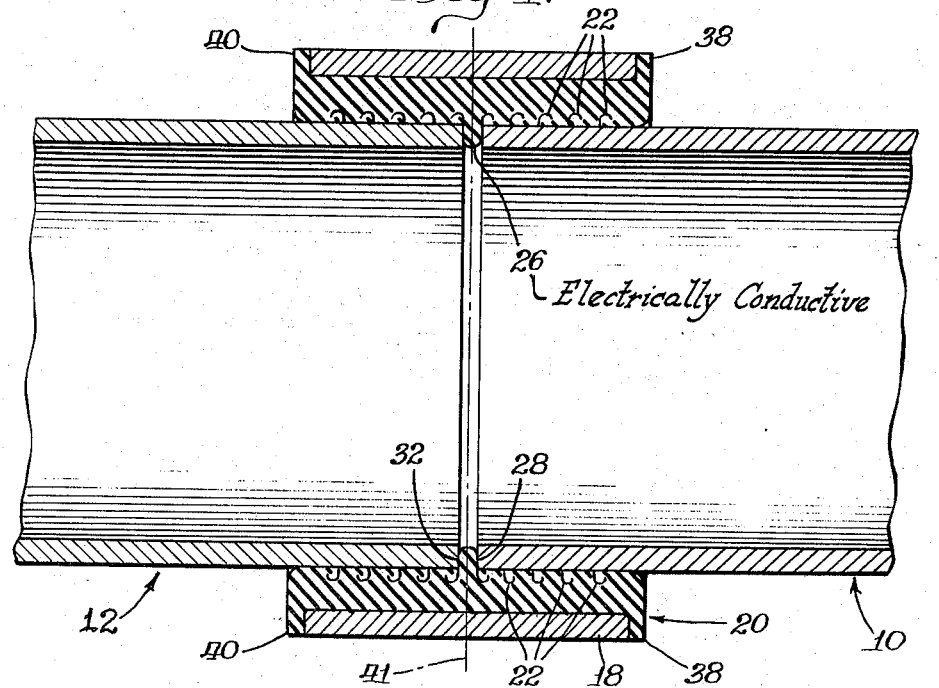
FIGURE 1 is a fragmentary, sectional view of a pipe joint connection showing the gasket in sealed relationship with the pipe sections.

Referring now to the drawings, a first length of pipe 10 is located adjacent a second length of pipe 12 so that an end of the first length is spaced a short distance from an end of the second length. A generally cylindrical clamping ring 18 having a diameter substantailly larger, preferably one nominal pipe size, then the diameter of the pipes being connected, is located about the ends of the two pipe lengths.

A resilient, annular gasket 20 is located about the ends of the pipe lengths and is confined within the clamping ring 18. A plurality of ridge-like projections 22 are formed on the inner circumferential surface of the gasket and are spaced a predetermined distance from each other. An annulus 26 is formed on the inner circumferential surface of the gasket generally intermediate the ends thereof. The annulus 26 is snugly confined between an end surface 28 of pipe 10 and an end surface 32 of pipe 12.

It shall be noted that the annulus may be formed of the same material as the main part of the gasket or it conceivably may be composed of an electrically conductive material that will provide for the passage of an electrical current between adjoining pipe sections. Thus, the desired feature of being able to thaw out frozen portions of pipe by introducing electrical energy into a pipe line may be accomplished.

The gasket 20 has an outer undulative circumferential surface 36 snugly confined by the clamping ring 18. Since the inner diameter of the clamping ring may vary to some degree, the undulative circumferential surface of the gasket serves to compensate for any variation and ensures that there be complete contact between the inner peripheral surface of the clamping ring and the outer circumferential surface of the gasket.

The gasket 20 has formed at its ends two retaining ridges 38 and 40 which act to maintain the gasket within the clamping ring at a desired location about the pipe joint.

The gasket in its preferable form may be composed of a natural rubber or a synthetic variety such as a Buna type N. The normal range of pipe sizes for which the gasket may have application is from 3" to 24" in diameter.

In the assembly of the clamping ring and gasket about the pipe joint, the gasket 20 is first positioned within the clamping ring 18 so that the outer circumferential surface 36 of the gasket maintains contact with the inner peripheral surface of the clamping ring. The retaining ridges 38 and 40 of the gasket are positioned in abutting conatct with the ends of the clamping ring.

One end of the clamping ring and gasket assembly is then forced over an end of one of the pipe lengths. Since the inside diameter of the gasket is somewhat less than the outer diameter of the pipe, the gasket will be forced to expand in order to be located about the end of the pipe. During the process of positioning the clamping ring and gasket assembly, the resultant expansion of the gasket, the inherent tendency of the gasket to return to its original shape, and the positioning of the gasket on the end of the pipe all coact to cause the projections 22 to be squeezed and distended into an agglomerate mass. Therefore, when the positioning process is complete, the gasket forms a tight uniform seal around the entire circumferential surface of the end of the pipe. This positioning process is continued until the center annulus 26 achieves contact with the end surface 28 of the pipe 10.

One end of the other pipe is then forced or driven into the other end of the clamping ring and gasket assembly. In a manner similar to that previously described, the projections 22 in this end of the gasket are squeezed and distended into an agglomerate mass to form a tight uniform seal around the end of the second pipe. The pipe is forced into the clamping ring and gasket assembly until the end 32 achieves contact with an annulus 26.

Figure 2:
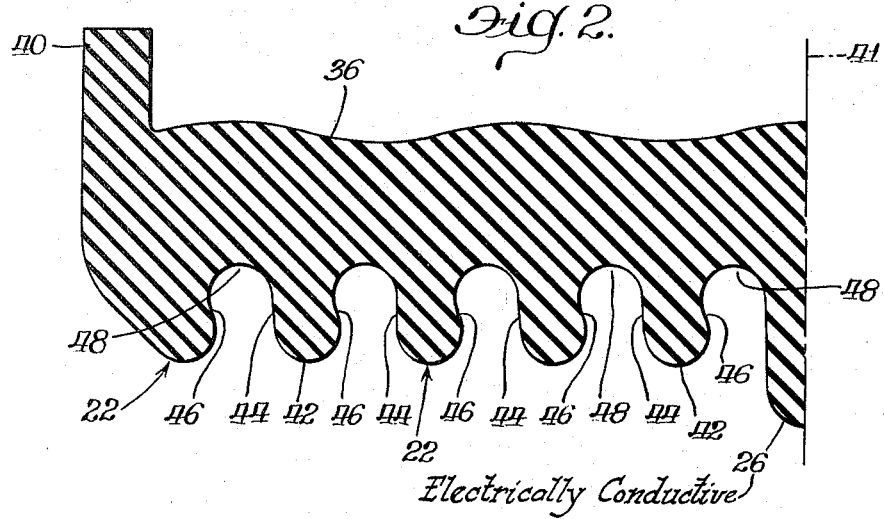
FIGURE 2 is a fragmentary sectional view of the gasket showing details of construction thereof.

It shall be noted that the projections 22 are regularly disposed on both sides of, and outwardly from, a center line of symmetry 41 that bisects the center annulus of the gasket. The projections are preferably designed in a distinctive manner and, when viewed in section, as in FIGURE 2, they are seen to be formed with a certain configuration that lends itself to the object of providing a fluid tight seal.

Each projection has a tip-end surface 42 formed in a shape that is semicircular in cross section. The tip-end surface of each projection may be extended radially away from the axis of the pipes on a side disposed outwardly from the center line of symmetry 41 of the gasket to form a flat surface 44. On the inner side of each projection, the tip-end surface is preferably extended to form an undercut arcuate surface 46.

The concave recess 48 is formed between projections by extending the undercut surface 46 of one projection and a flat surface 44 of an immediately adjacent projection toward each other in an arcuate manner until they meet to define a semicircular shape in the body of the gasket. All of the several recesses between projections may be formed in a manner similar to that just described. The semicircular shape of each recess 48 is seen to be substantially equal to or slightly larger than the semicircular shape of the tip-end surface of each projection 22.

Each projection is formed on the inner circumference of the gasket so that its undercut surface 46 faces toward the center annulus 26. Therefore, each projection on one side of the center line of symmetry of the gasket is seen to "mirror," or be the reverse, of its respective projection on the other side of the center line.

Therefore, when the gasket is forced on to an end of a pipe, or when a pipe is forced into the gasket, the projections, since their undercut surfaces face the annulus, are upset and distorted toward the annulus. The forcing procedure is continued until the annulus is squeezed between the ends of the pipes and, as a result each tip-end semicircular surface of a projection will be received by an immediately adjacent concave recess in snug complementary confinement. When the locating procedure is complete, all of the projections are received by an adjacent recess so that a seal is provided between the gasket and the outer circumferential surface of the pipe.

It shall be also noted that a lubricant of any conventional type may be used to facilitate placement of the gasket upon the end of the first pipe and for ease of installing the other pipe within the other side of the gasket.

It is therefore seen that the clamping ring 18 and the gasket 20, when properly positioned and secured about two spigot-end pipe lengths connected longitudinally, serve to provide a fluid type seal that is impervious to the liquid or gases under the pressures at which they are transferred within a pipe line.

Although but one embodiment of the invention is disclosed and described herein, it is apparent that other embodiments and modifications are possible within the scope of the appended claim.

I claim:

In a pipe joint for connecting a pair of pipes having straight ends, a first pipe having a first end surface spaced from a second end surface of a second pipe, a resilient annular nonmetallic gasket located about adjacent ends of said pair of pipes, a plurality of resilient projections formed on the inner circumferential surface of said gasket, said projections being disposed to agglomerate and fill the recesses between said projections when said gasket is located about said adjacent ends, an electrically conductive center portion formed generally intermediate the ends of said gasket and extending radially inwardly from said inner circumferential surface, said center portion disposed between and filling the space between said first and said second end surfaces, said center portion being effective to transfer electrical energy between said pair of pipes, and a clamping ring located about the outer circumferential surface of the gasket to maintain said gasket about the adjoining ends of said pair of pipes, said gasket being effective to form a fluid tight seal between said adjacent ends of said pair of pipes.

References Cited by the Examiner

UNITED STATES PATENTS

| | | | |
|---|---|---|---|
| 1,926,197 | 9/1933 | Durr | 285—110 |
| 2,615,741 | 10/1952 | Nathan | 277—208 |
| 2,750,573 | 6/1956 | Mika. | |

FOREIGN PATENTS 925,743  3/1955  Germany.

ROBERT K. SCHAEFER, *Primary Examiner.*

DARRELL L. CLAY, *Examiner.*